United States Patent [19]

Kashiwase

[11] Patent Number: 4,960,005
[45] Date of Patent: Oct. 2, 1990

[54] AUTOMATIC TRANSMISSION FOR A MOTOR VEHICLE

[75] Inventor: Hajime Kashiwase, Tokyo, Japan

[73] Assignee: Fuji Jukogyo Kabushiki Kaisha, Tokyo, Japan

[21] Appl. No.: 387,357

[22] Filed: Jul. 31, 1989

[30] Foreign Application Priority Data

Aug. 11, 1988 [JP] Japan .................. 63-201438

[51] Int. Cl.⁵ ............................... F16H 3/08
[52] U.S. Cl. ....................... 74/329; 74/359; 74/360; 74/333
[58] Field of Search ................. 74/329, 333, 359, 360

[56] References Cited

U.S. PATENT DOCUMENTS 2,567,446  9/1951  Polomski .............. 74/359 X
4,576,063  3/1986  Akashi et al. ......... 74/359 X
4,594,908  6/1986  Akashi et al. ......... 74/359
4,697,471  10/1987 Hiketa ................. 74/359

Primary Examiner—Dirk Wright
Attorney, Agent, or Firm—Beveridge, DeGrandi & Weilacher

[57] ABSTRACT

An automatic transmission for a motor vehicle comprises a power transmitting system divided into two gear-change units with respect to an input shaft for receiving the power from the engine, the power being transmitted to an output shaft through the two units, each of having respective counter shafts. The counter shaft of one of the units is provided thereon with a first gear stage meshed with a first drive gear fixedly supported on the input shaft. Control of the engine braking at the first-gear stage is accomplished by the engagement or disengagement of the lock up clutch.

1 Claim, 2 Drawing Sheets

AUTOMATIC TRANSMISSION FOR A MOTOR VEHICLE

BACKGROUND OF THE INVENTION

The present invention relates to automatic transmission for a motor vehicle.

When in first gear or when driving at low speed, releasing the accelerator pedal causes engine braking to act strongly and uncomfortable drive feeling. Many measures have been proposed to overcome this defect, as disclosed in Japanese Patent Laid-Open Appln. No. 75844/1985.

When the vehicle with the conventional automatic transmission is running at a low speed on a steep declining road, it becomes difficult to fully control the vehicle speed by only the engine brake set at only low gear ratio. That is, much use of the brakes is made, and fade tends to occur.

Another possible countermeasure is to couple a lock up clutch with an one-way clutch in the transmission. However, this increases an entire length of the transmission.

As still another measure, the same applicant has previously proposed the automatic transmission having two parallel counter shafts. These counter shafts are respectively provided with first- and second-gear stages and third- and fourth-gear stages. Space of a reverse gear unit in this transmission is used for a fourth gear. Therefore engine braking may be selectively utilized without increasing the entire length of the transmission.

In this transmission, however, these still remains the problems relating to strength and durability of transmission elements due to inertial force. These problems in the prior art will be described more fully hereinafter referring to drawings.

SUMMARY OF THE INVENTION

The present invention has been made in view of the circumstances described above. It is an object of the present invention to provide an automatic transmission characterized by the following features. Engine braking can be utilized through a first-gear stage. This feature can be acquired without increasing the entire length of the transmission. Moreover, the relative inertial force arising in the servomechanism at the time of shifting between forward and reverse can be reduced.

This and other objects of the present invention have been achieved by a provision of the automatic transmission wherein driving power of an engine through an input shaft of the transmission is transmitted to a driving power transmitting system divided into two gear-changing units. From these two gear-changing units, transmission of the driving power to a single output shaft is accomplished by the system. The automatic transmission provides the following four elements on a counter shaft of each unit; A first counter gear is meshed with a first drive gear fixedly supported on the input shaft. A counter output gear is coupled to the first counter gear supported on the counter shaft of a first-gear transmission clutch, a lock up clutch, and a one-way clutch. A counter reverse gear is supported on the same counter shaft and coupled through idler gears with a reverse input gear fixedly supported on the output shaft. A synchromechanism is provided for selectively coupling the lock up clutch and the counter reverse gear to the counter shaft.

Control of the engine braking at the first-gear stage is accomplished by an engagement or a disengagement of the lock up clutch.

As described above, the power transmitting system of the transmission is divided into the two gear change units on opposite (left and right) sides of the input shaft. In one unit, the lock up clutch coupled to the output shaft for the first-gear stage and a reverse mechanism are provided. In the other unit, the mechanisms of the second-gear and succeeding gear stages are provided. By this arrangement, a structural balance is maintained by distribution of the gear-change stages into two subsystems. For this reason, the entire length of the automatic transmission becomes short. Moreover, the engine braking by the first gear stage can be utilized when necessary. At the same time, the relative inertial force in a synchromechanism may be reduced when shifting between forward and reverse and therefore reduces an impact due to shifting. Therefore strength and durability are improved.

These and other objects and features of the present invention will become understood from the following description with reference to the accompanying drawings.

DETAILED DESCRIPTION OF THE PREFERRED EMBODIMENTS

Figure 3:
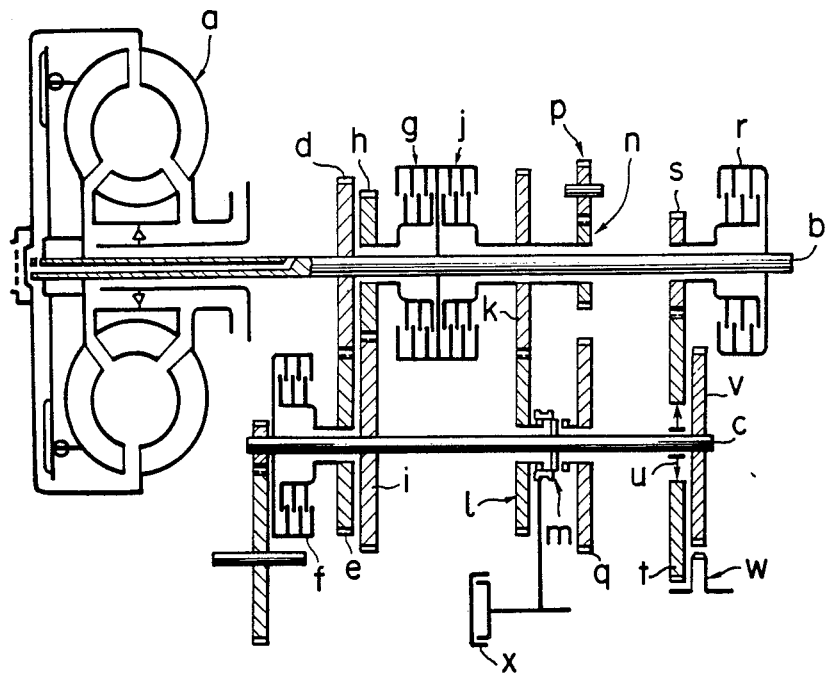
FIGS. 3 and 4 are schematic views similar to FIG. 1 respectively showing known automatic transmissions.

Referring to FIG. 3, power outputted by an engine (not shown) is transmitted through a torque converter a to an input shaft b of the transmission. A counter shaft is provided parallel to the input shaft b. A third drive gear d is provided on the input shaft b. A third driven gear e is meshed with the third drive gear d. The power is transmitted from the third driven gear e to the counter shaft c through a third speed transmission clutch f. Thus, a third-gear stage is attained. At the same time, the power is transmitted by a second speed transmission clutch g provided on the input shaft b to a second drive gear h. The power is further transmitted by a second driven gear i meshed with the second drive gear h to the counter shaft c. Thus a second-gear stage is attained.

Similarly, the power is transmitted by a fourth-gear transmission clutch j provided on the input shaft b to a fourth drive gear k. The power is further transmitted by a fourth driven gear l and a synchromechanism m to the counter shaft c. Thus a fourth gear stage is attained. At the same time, the power is transmitted by a reverse drive gear n rotating with the fourth drive gear k and a reverse idler gear p to a reverse driven gear q. The power is further transmitted by the synchromechanism m to the counter shaft c. Thus a reverse-gear stage is attained.

Furthermore, the power is transmitted through a first-gear transmission clutch r provided on the input shaft b to a first ("low") drive gear s. The power is further transmitted via a first driven gear t and a one-way clutch u to the counter shaft c. Thus a first-gear stage is attained.

By transmitting the power by the first driven gear t and the one-way clutch u to the counter shaft c as described above, an aforementioned undesirable engine braking action as felt by the driver at the time of the first-gear stage driving or the low-gear driving is prevented. Additional mechanical elements in FIG. 3 are a parking gear v, a parking pawl w and a servo-valve x for selectively changing over the synchromechanism m.

However, even when the vehicle with the automatic transmission is running at low speed on a relatively steep downhill, it becomes difficult to sufficiently control the vehicle speed by setting the gear ratio for engine braking. That is, when the vehicle is being driven on a steep and relatively long downhill road having many sharp curves, the brakes are used extensively, and fade tends to occur. For this reason, one conceivable measure is the additional coupling of a lock up clutch to the one-way clutch u aforementioned. By engaging or disengaging the lock up clutch, the engine braking is controlled by the first-gear stage. In this case, the entire length of the automatic transmission will be increased because of the installation of this lock up clutch.

However, this measure has a problem in such cases as the use of the above described automatic transmission with an engine mounted lengthwise. In this case, an increase in the entire length of the automatic transmission must be avoided because of securing narrow floor space near the driver's seat.

Figure 4:
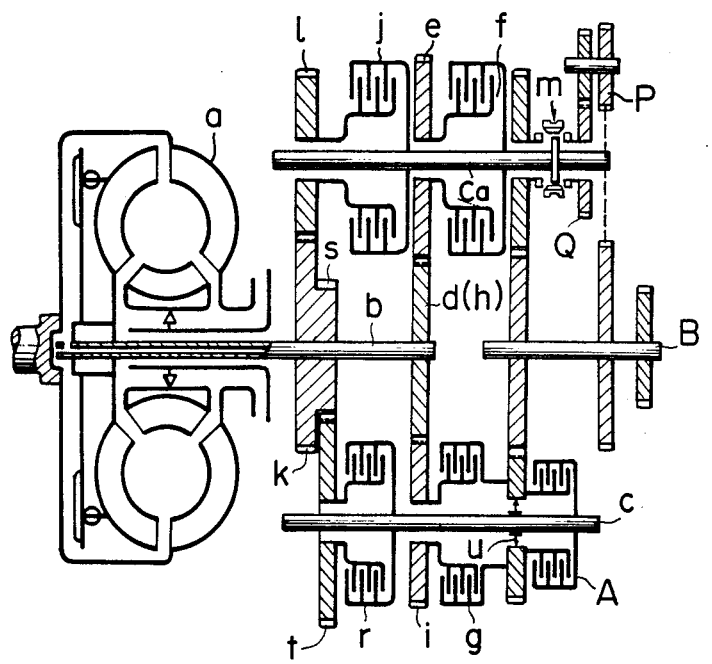

Accordingly, the applicant has previously proposed an automatic transmission as disclosed in the specification of Japanese Pat. Appln. No. 133560/1988. In this transmission, as shown in FIG. 4, two parallel counter shafts C and Ca are used. These counter shafts C, Ca are provided respectively with first- and second-gear stages and third and fourth-gear stages. In this transmission, the space of the reverse gear unit is used in the case of fourth gear stage. Therefore the functional capability of selectively utilizing the engine braking without lengthening the entire length of the automatic transmission can be added. In this transmission, however, the first-gear lock up clutch A installed on one of the counter shafts C is always matched with a clutch r for the first gear to operate cooperatively therewith. For this reason, the counter reverse gear Q (corresponding to a reverse drive gear q) is to function in combination with the third driven gear e and the fourth driven gear l fixed to the other counter shaft Ca and producing a relatively high gear ratio. Then, in order to bring the reverse gear ratio to a predetermined value, a desired gear ratio must be obtained in a mechanism between the counter shaft Ca and the drive shaft B to which power is transmitted from the counter shaft Ca. On the other hand, the shifting from drive (forward gears) to reverse (reverse gear) gives rise to an inertial force. In order to reduce this inertial force, the provision of a shifting clutch for the counter shaft Ca is optimal. However, this counter shaft Ca and the counter reverse gear Q associated therewith rotate in opposite directions for forward gears. For this reason, the relative rotational speed in the synchromechanism at the time of shifting is high. Consequently, a problem relating to the strength and durability of these parts occurs.

In view of the above described circumstances the present invention seeks to provide an automatic transmission characterized by the following features. Engine braking can be effected to when necessary with the transmission in its first gear stage. This feature can be achieved without increasing the entire length of the transmission. Moreover, inertial force arising in the synchromechanism at the time of shifting between forward gears and reverse gear can be reduced.

The above described problems encountered in the prior art regarding the automatic transmissions have been overcome by the present invention which will now be described in detail with respect to a preferred embodiment thereof.

Figure 1:
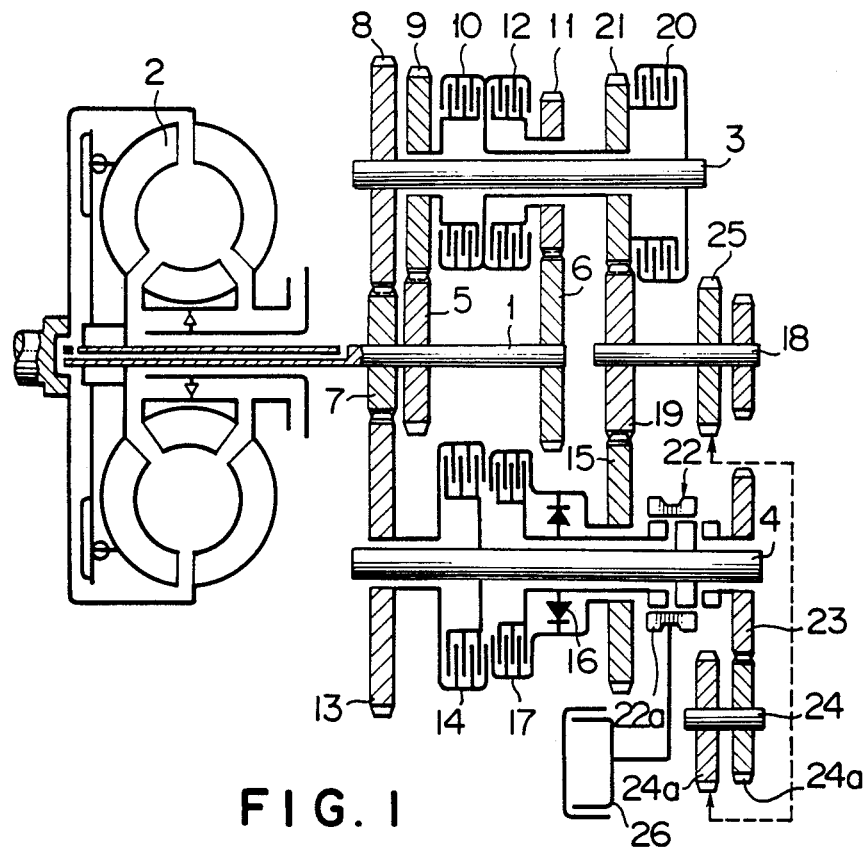
FIG. 1 is a schematic view of an automatic transmission of the present invention.
Figure 2:
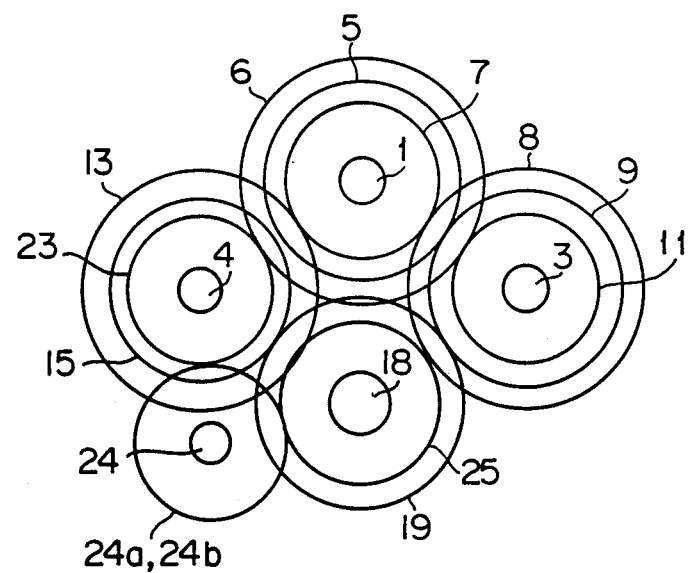
FIG. 2 is an end elevational view of meshing of the various gears in the transmission.

Referring to FIGS. 1 and 2, power from an engine (not shown) is transmitted via a torque converter 2 to an input shaft 1 of an automatic transmission. Parallel to the input shaft 1 and on opposite sides thereof are provided a first counter shaft 3 and a second counter shaft 4. The input shaft 1 fixedly supports a first/second drive gear 7, a third drive gear 5, and a fourth drive gear 6.

On the first counter shaft 3 is fixedly supported a second counter gear 8 meshed with the first/second drive gear 7. A third counter gear 9 meshed with the third drive gear 5 is rotatably supported on the first counter shaft 3. The third counter gear 9 is coupled by a coaxial third-gear transmission clutch 10 (a hydraulic multi-plate clutch) to a coaxial counter output gear 21 to transmit the power thereto. Furthermore, a fourth counter gear 11 meshed with the fourth drive gear 6 is rotatably and coaxially supported on the first counter shaft 3. The fourth counter gear 11 is coupled by a coaxial fourth-gear transmission clutch 12 (the hydraulic multi-plate clutch) to the counter output gear 21 to transmit motive power thereto. In addition, a second-gear transmission clutch 20 (the hydraulic multi-plate clutch) is disposed coaxially on one side of the output gear 21. Through the clutch 20, the output gear 21 and the first counter shaft 3 are selectively coupled and uncoupled.

On the second counter shaft 4, a first counter gear 13 meshed with the first/second drive gear 7 is rotatably supported. The first counter gear 13 is coupled by a first-gear transmission clutch 14 (the hydraulic multi-plate clutch) to the second counter shaft 4 to transmit the power thereto.

A synchromechanism 22 is further disposed coaxially on the second counter shaft 4. On one side of the synchromechanism 22, a coaxial counter output gear 15 is coupled thereto by a one-way clutch 16 and a lock up clutch 17 (the hydraulic multi-plate clutch). When a selector 22a of the synchromechanism 22 is selectively shifted to the side of the counter output gear 15, the power is transmitted from the second counter shaft 4 through either of the one-way clutch 16 or the lock up clutch 17 to the counter output gear 15.

At a position lower than the input shaft 1 and parallel to the first and second counter shafts 3 and 4 is disposed an output shaft 18. The output shaft 18 transmits the power through a differential mechanism and a final speed-reduction device (both not shown) to at least one driving axle of the vehicle. A drive input gear 19 meshed with the counter output gears 15 and 21 is fixedly supported on the output shaft 18.

On the second counter shaft 4, on the other side of the synchromechanism 22, a counter reverse gear 23 is rotatably supported. When the selector 22a of the synchromechanism 22 is selectively shifted to the side of the counter reverse gear 23, the power is transmitted from the second counter shaft 4, through the counter reverse gear 23, first and second idler gears 24a and 24b fixedly supported on an idler shaft 24, and a reverse input gear 25 fixedly supported on the output shaft 18, to this output shaft 18. The synchromechanism 22 is actuated by a servo-valve 26.

The automatic transmission of the mechanical type described above according to the present invention operates in the following manner.

The power entering into the transmission via the torque converter 2 drives the input shaft 1. The power thus transmitted to the input shaft 1 is transmitted further through the drive gears 5, 6, and 7 fixed to the input shaft 1 to drive the driven gears 8, 9, 11, and 13 provided on the first and second counter shafts 3 and 4.

First, when starting, the vehicle the first-gear transmission clutch 14 is engaged. Then, as the engine speed increases, the transmitted torque increases. Thus, the power being transmitted to the first counter gear 13 through the torque converter 2, the input shaft 1 and the first/second drive gear 7 fixedly supported on this input shaft 1 is transmitted to the second counter shaft 4. Here, the power is transmitted through the synchromechanism 22 and the one-way clutch 16 to drive the counter output gear 15. The power is further transmitted through the drive input gear 19 meshed with this counter output gear 15 and thus through the output shaft 18 to the driving axle (not shown) of the vehicle. The vehicle is thus driven forward by the first gear.

In this case, if an accelerator pedal is released, rotational speed of the second counter shaft 4 will decrease. Then the one-way clutch 16 will operate to make a free-wheeling rotation. Then, even if the rotational speed of the counter output gear 15 is relatively higher than that of the second counter shaft 4, an engine braking will not be transmitted to the output shaft 18.

When, under these operational conditions, an application of the engine braking is desired, the lock up clutch 17 is engaged. As a consequence, the second counter shaft 4 and the counter output gear 15 are coupled via the synchromechanism 22. Thus the engine braking with the transmission by the first gear stage is realized.

In shifting between forward and reverse, the transmission operation passes through neutral. For this reason, the first-gear transmission clutch 14 is temporarily released. The second counter shaft 4 is thereby in a free state relative to the engine and then, hydraulic pressure is applied to the servo-valve 26. The synchromechanism 22 thereby operates to couple the second counter shaft 4 and the counter reverse gear 23. In this case, shifting is performed only by the second counter shaft 4 and the first-gear transmission clutch 14. Therefore the inertial force is small. The impact force occurring during shifting can thereby be reduced.

The states of engagement of the gear-change elements at each of the gear-change stages of the above described automatic transmission are indicated in the following Tabled 1. In Table 1, a symbol "O" indicates engagement, and a symbol Δ indicates that engagement is made only when necessary at the time of the engine braking.

The automatic transmission described above and operation according to the present invention have the following features of merit.

The power from the engine through the input shaft is divided into two systems. The first counter gear is supported on the counter shaft of one of these systems. To the first counter gear, the counter output gear is coupled via the first-gear transmission clutch, the lock up clutch, and the one-way clutch. At the same time, the lock up clutch and the counter reverse gear can be selectively coupled to the counter shaft by the synchromechanism. Therefore, without increasing the size of the automatic transmission, unpleasant feeling of the engine braking when the accelerator pedal is released during driving in the first gear can be prevented. Furthermore, during descent on the steep downhill road, a desired engine braking action can be obtained by engaging the lock up clutch. In addition, the load imposed by inertial force with respect to the synchromechanism at the time of shifting between forward and reverse can be reduced. Thus the automatic transmission of the present invention is advantageous with respect to both strength and endurance.

While the presently preferred embodiment of the present invention have been shown and described, it is to be understood that these disclosures are for the purpose of illustration and that various changes and modifications may be made without departing from the scope of the invention as set forth in the appended claims.

What is claimed is:

1. An automatic transmission for a motor vehicle having a power transmitting system divided into two gear change units with respect to an input shaft for receiving the power from an engine, said power being transmitted through said units to an output shaft, said units having respective counter shafts and a first gear stage provided between said input shaft and one of said counter shafts, the improvement of the transmission which comprises:

a first counter gear meshed with a first drive gear fixedly supported on said input shaft;

a counter output gear coupled to said first counter gear by a first-gear transmission clutch, a lock up clutch, and a one-way clutch;

a counter reverse gear coupled through idler gears to a reverse input gear fixedly supported on said output shaft; and a synchromechanism for selectively coupling said lock up clutch and said counter reverse gear to said counter shaft so as to control engine braking of the vehicle in said first-gear stage by said lock up clutch.

Table 1

| Engagem't Element gear change stage | Clutch 14 for 1st-gear speed change | Clutch 20 for 2nd-gear speed change | Clutch 10 for 3rd-gear speed change | Clutch 12 for 4th-gear speed change | Lock clutch 17 | One-way clutch 16 |
|---|---|---|---|---|---|---|
| 1st | O | | | | Δ | O |
| 2nd | | O | | | | |
| 3rd | | | O | | | |
| 4th | | | | O | | |
| Rev. | O | | | | | |

* * * * *